United States Patent [19]

Kimura et al.

[11] Patent Number: 5,250,244
[45] Date of Patent: Oct. 5, 1993

[54] METHOD OF PRODUCING SINTERED CERAMIC BODY

[75] Inventors: Yukihiro Kimura; Sumihito Tominaga; Rokuro Kanbe, all of Nagoya, Japan

[73] Assignee: NGK Spark Plug Company, Ltd., Aichi, Japan

[21] Appl. No.: 911,782

[22] Filed: Jul. 10, 1992

Related U.S. Application Data

[63] Continuation of Ser. No. 586,982, Sep. 24, 1990, abandoned.

[30] Foreign Application Priority Data

Sep. 26, 1989 [JP] Japan ............... 1-249737
Sep. 26, 1989 [JP] Japan ............... 1-249738

[51] Int. Cl.$^5$ .................................. C04B 35/64
[52] U.S. Cl. .............................. 264/63; 264/344
[58] Field of Search ......................... 264/63, 344

[56] References Cited

U.S. PATENT DOCUMENTS

| | | | |
|---|---|---|---|
| 4,080,414 | 3/1978 | Anderson | 264/63 |
| 4,126,653 | 11/1978 | Smith | 264/63 |
| 4,135,938 | 1/1979 | Murata | 264/65 |
| 4,154,787 | 5/1979 | Brown | 264/63 |
| 4,671,912 | 6/1987 | Komatsu | 264/63 |
| 4,701,427 | 10/1987 | Boecker | 264/65 |
| 4,818,455 | 4/1989 | Huseby | 264/65 |
| 5,089,194 | 2/1992 | Hoffmann | 264/63 |

FOREIGN PATENT DOCUMENTS

| | | |
|---|---|---|
| 59-179307 | 10/1984 | Japan . |
| 62-128965 | 6/1987 | Japan . |
| 1-197349 | 8/1989 | Japan . |

*Primary Examiner*—James Derrington
*Attorney, Agent, or Firm*—Finnegan, Henderson, Farabow, Garrett & Dunner

[57] ABSTRACT

A method of producing a sintered body by molding a mixture of a ceramic base powder, a sintering assistant powder and an organic binder and sintering the molded body in a non-oxidizing atmosphere is disclosed in which the ceramic base powder has such a particle size distribution that the amount of powder particles not greater than 1.0 μm in size is not more than 15% by weight and the average particle diameter is not greater than 5 μm. According to the method, therefore, sufficient passage of gas is secured in a degreasing step, resulting in an enhanced degreasing efficiency and exellent sintering properties. Where the sintering assistant powder has such a particle size distribution that the amount of powder particles not greater than 10 μm in size is not more than 5% by weight, the amount of coarse powder is extremely small and, therefore, large voids are not formed. It is thus possible to produce easily a high-quality sintered body by controlling the respective particle size distributions of the powders.

5 Claims, 2 Drawing Sheets ived, as a sintering body with a high-quality and little warpage.

METHOD OF PRODUCING SINTERED CERAMIC BODY

This application is a continuation of application Ser. No. 07/586,982, filed Sep. 24, 1990, now abandoned.

BACKGROUND OF THE INVENTION

1. Field of the Invention

This invention relates to a method of producing a sintered ceramic body with excellent degreasing efficiency and sintering properties, and to a method of producing a sintered ceramic body with stable and high quality. More particularly, the invention relates to a method of producing a ceramic wiring board.

This invention is applicable to a wide range of industrial fields where there is need for a dense sintered ceramic body, such as IC packages, thick- or thin-film substrates and glazed substrates.

2. Description of the Prior Art

Heretofore, ceramic base particles for use in the production of, for instance, a multilayer ceramic wiring board have been used with control of only the average particle diameter thereof.

Also, a sintering assistant powder added in the production of sintered ceramic body has hitherto been used with control of only the average particle diameter thereof. A method of improving sintering properties by reducing the average particle diameter of the assistant powder has also been known.

In the conventional method of producing a sintered ceramic body as mentioned above, the powder to be sintered is usually fired at a temperature of 1400° to 1600° C. in a non-oxidizing atmosphere. When ceramic base particles having a large average particle diameter are used, in general, a considerable number of ceramic base particles of large size are present in the powder to be sintered. The large particles causes nonuniform sintering, leading to higher possibility of void formation, so that a sufficient increase in sintered density is not achieved. Use of ceramic base particles with a small average particle diameter, on the other hand, generally fails to increase the sintered density where firing is conducted in a non-oxidizing atmosphere, though the sintering property of the ceramic base particles is enhanced. Thus, the use of the ceramic base particles with a small average particle diameter does not always yields a sintered body of enhanced quality.

Even when only the average particle diameter of the sintering assitant powder is specified as mentioned above, the assistant powder generally shows wide dispersion of particle size and, therefore, a considerable number of coarse particles are present in the powder. Accordingly, large voids exceeding about 15 to 20 μm in diameter may be formed in the inside or the surface of the sintered body. The presence of such large voids impairs the stability of electrical and mechanical properties and the like which the sintered body would intrinsically have. Especially in the case of a wiring board, the presence of the large voids would cause breakage of a thin film formed on the board or dispersion of resistance values, leading to deterioration of thermal shock properties or to nonuniformity of strength.

SUMMARY OF THE INVENTION

This invention contemplates solving the above-mentioned problems in the prior art, and has been attained based on the finding of a great effect of the particle size distribution of ceramic base particles, especially the distribution of finer particles, on the degreasing and sintering properties of the ceramic base particles.

It is accordingly an object of this invention to provide a method of producing a sintered ceramic body with excellent degreasing and sintering qualities, namely, a method of producing a high-quality sintered ceramic body with a high sintered density and little warpage.

This invention is based also on the finding of the fact that the particle size distribution of a sintering assistant powder added in sintering a ceramic base powder, particularly the distribution of coarse particles, has a great effect on the void formed in the sintered body.

It is accordingly another object of this invention to provide a method of producing a sintered ceramic body of high quality through preventing the formation of large voids.

According to this invention, there is provided a method of producing a sintered ceramic body which comprises molding a mixture containing a ceramic base powder, a sintering assistant powder and an organic binder, and sintering the molded body in a non-oxidizing atmosphere to produce the sintered body, characterized in that the ceramic base powder has such a particle size distribution that the amount of powder particles not greater than 1.0 μm in size is not more than 15% by weight and the average particle diameter is not greater than 5 μm.

According to this invention, there is also provided a method of producing a sintered ceramic body, which comprises mixing a ceramic base powder and a sintering assistant powder, molding the resultant mixture and sintering the body to produce the sintered body characterized in that the sintering assistant powder has such a particle size distribution that the amount of powder particles not smaller than 10 μm in size is not more than 5% by weight.

According to this invention, there is further provided a method of producing a sintered ceramic body which comprises mixing a ceramic base powder, a sintering assistant powder and an organic binder, molding the resultant mixture and sintering the molded body to produce the sintered body, characterized in that the sintering assistant powder has such a particle size distribution that the amount of powder particles not smaller than 10 μm in size is not more than 5% by weight.

According to this invention, there is further provided a method of producing a sintered ceramic body which comprises mixing a ceramic base powder and a sintering assistant powder, molding the resultant mixture and sintering the molded body to produce the sintered body, characterized in that the ceramic base powder has such a particle size distribution that the amount of powder particles not greater than 1.0 μm in size is not more than 15% by weight and the average particle diameter is not greater than 5 μm, and the sintering assistant powder has such a particle size distribution that the amount of powder particles not smaller than 10 μm in size is not more than 5% by weight.

According to this invention, there is further provided a method of producing a sintered ceramic body which comprises mixing a ceramic base powder, a sintering assistant powder and an organic binder, molding the resultant mixture and sintering the molded body to produce the sintered body, characterized in that the ceramic base powder has such a particle size distribution that the amount of powder particles not greater than 1.0 μm in size is not more than 15% by weight and the average particle diameter is not greater than 5 μm, and the sintering assistant powder has such a particle-size distribution that the amount of powder particles not smaller than 10 μm in size is not more than 5% by weight.

In the degreasing and firing in each atmosphere mentioned above, the particle size distribution of the ceramic base particles such that the amount of the particles not greater than 1.0 μm in size is not large, namely, not more 15% by weight ensures that void space is secured between the particles in the degreasing step and sufficient passage of gas is also secured, resulting in an enhanced degreasing effect. The enhanced degreasing effect, in turn, ensures uniform removal of the residual binder in the firing step.

In addition, since the average particle diameter of the ceramic base particles is not greater than 5 μm, the amount of coarse particles having a size of 10 to 20 μm or above is extremely small, which provides excellent sintering properties.

Thus, according to the method of this invention, excellent degreasing properties and sintering properties and a good balance of both the properties are obtained. According to the method of this invention, therefore, these properties altogether have the effect of ensuring the formation of a sintered body (particularly, a substrate or board) which has few internal voids, a high sintered density and little warpage. In addition, the good effect is displayed in a wide sintering temperature range and, therefore, it is possible to produce a sintered body with a stable sintered quality.

As mentioned above, this invention makes it possible to produce a sintered body of high quality by use of ordinary economical degreasing and sintering conditions, particularly in the cases of sheet forming, injection molding or the like where a comparatively large amount of an organic binder is used. The method of this invention is extremely useful especially for production of a multilayer ceramic wiring board, etc.

Besides, in the production of a sintered body, generally, a sintering assistant is first melted to wet alumina particles and rearrangement of particles takes place with the attendant contraction, when the volumes occupied by the particles of the sintering assistant become vacancies. With a further progress of the sintering, the vacancies are gradually contracted through a diffusion phenomenon. In general, however, the vacancies which are large in the beginning of the sintering would be left as voids after completion of the sintering.

According to this invention, on the other hand, the particle size of the sintering assistant powder is so set that the amount of coarse particles is extremely small, that is, the amount of particles not smaller than 10 μm is not more than 5% by weight. Therefore, there is no possibility that large void greater than 15 μm may be left after completion of sintering.

As mentioned above, according to this invention it is possible to prevent the formation of large void in the inside or surface of a sintered ceramic body, by a comparatively simple operation of controlling the particle size distribution of the sintering assistant powder. It is therefore possible to produce the sintered body with an enhanced and stable quality.

Especially where the sintered body is used as a wiring board, there is no possibility of large voids causing line breakage of a thin film, dispersion of resistance values or the like, and it is possible to restrain or prevent the deterioration of thermal shock properties or the dispersion of strength.

As mentioned above, when the ceramic base powder has such a particle size distribution that the amount of powder particles not greater than 1.0 μm in size is not more than 15% by weight and the average particle diameter is not greater than 5 μm, and the sintering assistant powder has such a particle size distribution that the amount of powder particles not smaller than 10 μm in size is not more than 5% by weight, it is possible to provide enhanced degreasing effect and prevent the formation of large void in the inside or surface of a sintered ceramic body.

The above and other objects, features and advantages of this invention will become apparent from the following discription and appended claims, taken in conjunction with the accompanying drawings.

DETAILED DESCRIPTION OF THE INVENTION

Figure 1:
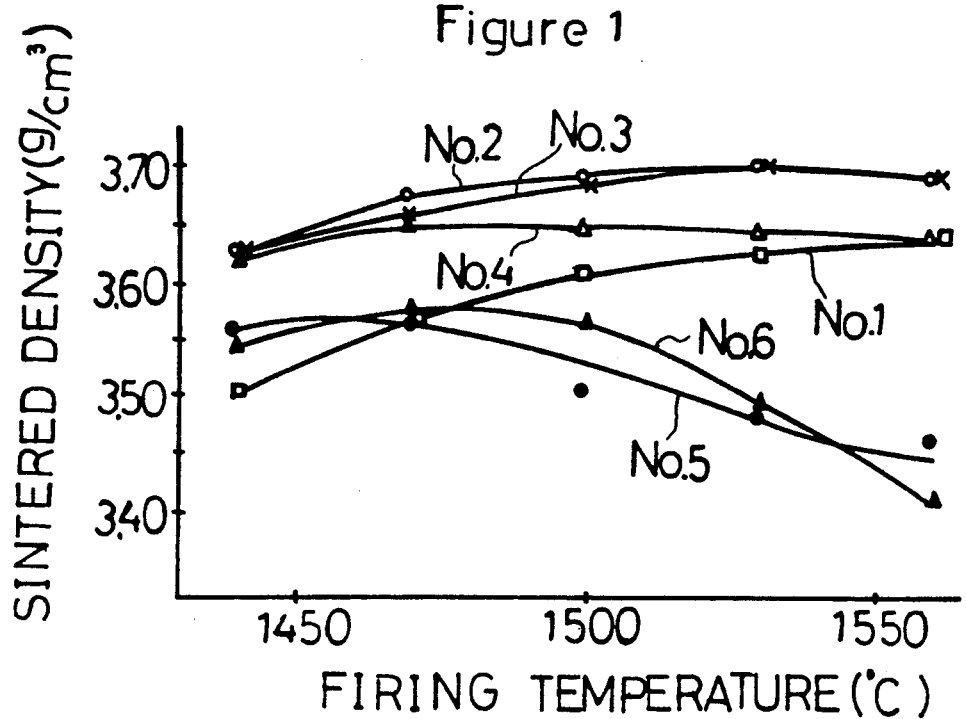
FIG. 1 is a graph showing the relationships between particle size distribution of ceramic base particles in Example 1, firing temperature and sintered density.

A method of producing a sintered ceramic body according to this invention comprises molding a mixture containing a ceramic base powder, a sintering assistant powder and an organic binder, and sintering the molded body in a non-oxidizing atmosphere to produce the sintered body, wherein the ceramic base powder has such a particle size distribution that the amount of powder particles not greater than 1.0 μm in size is not more than 15% by weight (hereinafter referred to as "%") and the average particle diameter is not greater than 5 μm.

Where an organic binder is used, especially where the organic binder is used in a comparatively large amount (as in the cases of sheet forming, injection molding, etc.), degreasing is generally carried out in the atmospheric air up to a temperature at which the constituents of a molded body is not oxidized (in the case of a multilayer alumina wiring board, the temperature is up to about 200° to 300° C., for prevention of the oxidation of tungsten or molybdenum in wiring patterns), followed by firing in a non-oxidizing atmosphere at 1400° to 1600° C. It was found out, however, as a result of the present inventors' studies that if the binder is not removed efficiently during the degreasing and firing steps, the binder remains as carbon in the sintered body to hinder the firing, thereby causing the formation of internal voids, with the result of failure in increasing the sintered density. It was also found that, in such a situation, nonuniform removal of the bindrer occurs, leading to warpage of the board (substrate) or the like. It was further found out, as a result of the present inventors' studies, that it is possible to solve the above problems by controlling the particle size distribution of the ceramic base particles. This invention has been attained based on the findings.

The kind of the ceramic base powder, the sintering assistant powder and the organic binder are selected according to the purpose or use of the sintered body. The amount of the organic binder used is not particularly limited. This invention, however, is especially suitable for the case where the binder is ordinarily used in a comparatively large amount, such as sheet forming, injection molding and extrusion. This is because the particle size distribution has a great influence on the degreasing efficiency.

The particle size distribution of the ceramic particles is such that the amount of the particles not greater than 1.0 μm is not more than 15%. If the amount exceeds 15%, the ceramic particles contain many fine particles, which prevents sufficient passage of gas in the degreasing step and lowers the degreasing efficiency, resulting in the formation of a large number of internal voids and in an insufficient sintered density. In such a case, furthermore, uniform degreasing is not achieved, so that the residual binder is not removed uniformly in the firing step. As a result, the sintered body obtained upon firing shows large warpage, especially in the case of a board (substrate). If the average particle diameter exceeds 5 μm, the ceramic particles contain a considerable number of large particles, particularly particles 10 to 20 μm or above in size. The presence of such large particles leads to unsatisfactory sintering properties and easier formation of voids, resulting in a poor sintered density.

A method of producing a sintered ceramic body according to this invention is characterized by controlling of the particle size distribution of the sintering assistant powder so that the amount of particles not smaller than 10 μm in size is nor more than 5%.

The particle size distribution of the sintering assistant powder is controlled as mentioned above because if the amount of the particles not smaller than 10 μm exceeds 5%, the diameter of voids formed in the sintered body would exceed 15 μm. For instance, the pitch of thin film employed in an IC package, IC board or the like is about 30 to 50 μm, and the reliability of the board or the like is lowered unless the void diameter is less than about ⅓ to ½ times the width. That is to say, the above-mentioned control of the particle size distribution is conducted because the presence of voids exceeding 15 μm in size causes line breakage of the thin film patterns, dispersion of resistance values or the like.

The kinds of the ceramic base particles and the kind of the sintering assistant are selected according to the purpose or use of the sintered body, and the assistant powder is selected appropriately according to the ceramic base particles used. Furthermore, an organic binder or the like is also blended depending on the molding method.

As the ceramic base particles in this invention, for instance, alumina, aluminum nitride, mullite, or the like can be used. As the sintering assistant, there can be used $SiO_2$, CaO, MgO, $B_2O_3$, $CaCO_3$, $MgCO_3$ or the like. As the organic binder, there can be used a butyral resin, a mathacrylate resin, polyurethane, or the like.

In this invention, the molded body may be subjected directly to the firing step without being treated in the step of heating at a relatively low temperature (for instance, 200° to 400° C.) for the purpose of so-called degreasing (degreasing step). Ordinarily, however, the degreasing step is carried out in order to enhance the degreasing efficiency and to enhance quality of the product.

The degreasing is usually carried out in an oxidizing atmosphere, which is ordinarily the atmospheric air. The firing is carried out in a non-oxidizing atmosphere, which may be a mixed reducing atmosphere of nitrogen and hydrogen, or the like. The firing temperature may be a temterature ordinarily used for firing in the above-mentioned atmosphere (generally, about 1400° to 1600° C.).

EXAMPLES

This invention will now be explained in detail referring to the following examples.

EXAMPLE 1

This example gives investigations of the relationships between the particle size distribution of an alumina base powder, average particle diameter, and degreasing properties or sintering properties.

Test powder product Nos. 1 to 6 of alumina (base particles) having respective particle size distributions and average particle diameters as set forth in the following table 1 were prepared.

TABLE 1

| Test powder product | Proportion of particles not greater than 1 μm | Average particle diameter |
| --- | --- | --- |
| No. 1 | <1% | 5.3 μm |
| No. 2 | 8% | 4.1 μm |
| No. 3 | 12% | 3.6 μm |
| No. 4 | 20% | 2.2 μm |
| No. 5 | 30% | 1.6 μm |
| No. 6 | 32% | 1.6 μm |

Figure 3:
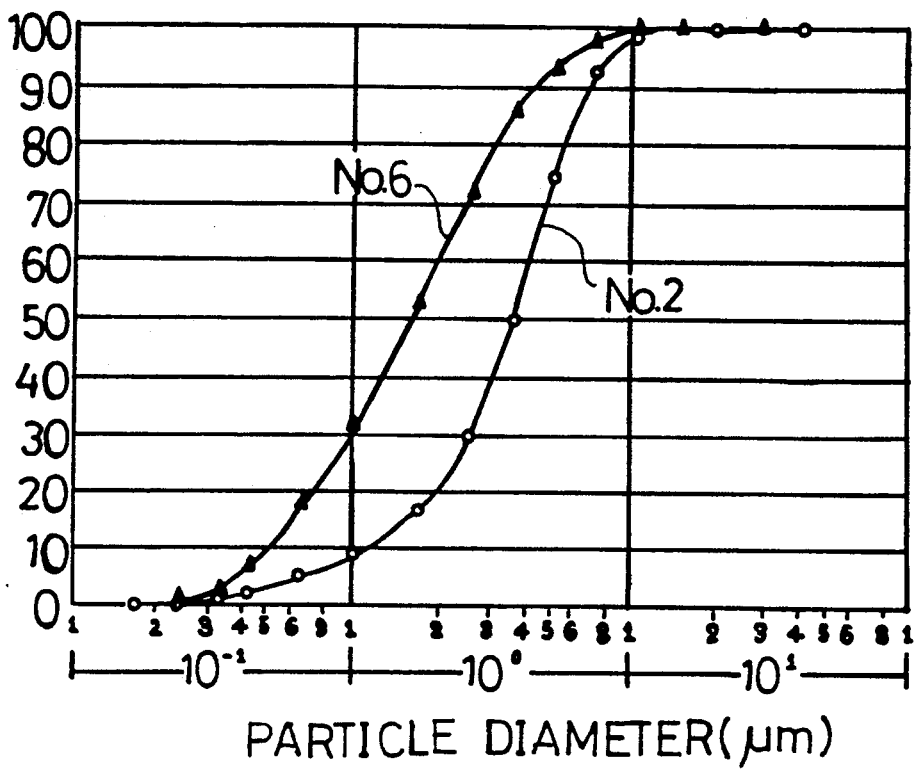
FIG. 3 is a graph showing particle size distribution of test powder product Nos. 2 and 6 (ceramic base particles)

The particle size distribution was measured by a laser-type particle size distribution measuring method with MICROTRACK (tradename, made by LEEDS & NORTHRUP). The average particle diameter was represented by the particle diameter at a cumulative particle number equal to 50% of the total number of particles. The measurement results of the particle size distribution of the test powder product Nos. 2 and 6 are shown in FIG. 3.

Thereafter, a total of 100 parts by weight of mixed powders corresponding to a composition of 92% of alumina having each of the above-mentioned particle size distribution and 8% of a sintering assistant (average particle diameter: about 2.0 μm) such as $SiO_2$, CaO and MgO was admixed with predetermined amounts of an organic solvent (for instance, methyl ethyl ketone or toluene) and balls (made of alumina). The admixture was well mixed and ground in a rotary mill, and about 8 parts of a butyral resin and about 4 parts of a plasticizer were added thereto, followed by mixing to prepare a homogeneous slurry. The slurry was used in a tape casting method to form a green sheet 0.6 mm. thick. Four such green sheets were laminated with each other. The laminate was cut to a size of 36×24 mm.

Next, the cut laminate was degreased by heating up to 250° C. in the atmospheric air at a rate of 30° C./hr. Then, the degreased laminates were fired in a reducing atmosphere consisting of a hydrogen (about 50 vol %) nitrogen (about 50 vol %) mixed gas so that the materials being fired reach the relevant temperatures given in FIGS. 1 and 2 in the range of 1440° to 1560° C., to produce sintered plate Nos. 1 to 6. Of the sintered plates, Nos. 2 and 3 are the products according to this invention, while the others are comparative products.

Figure 2:
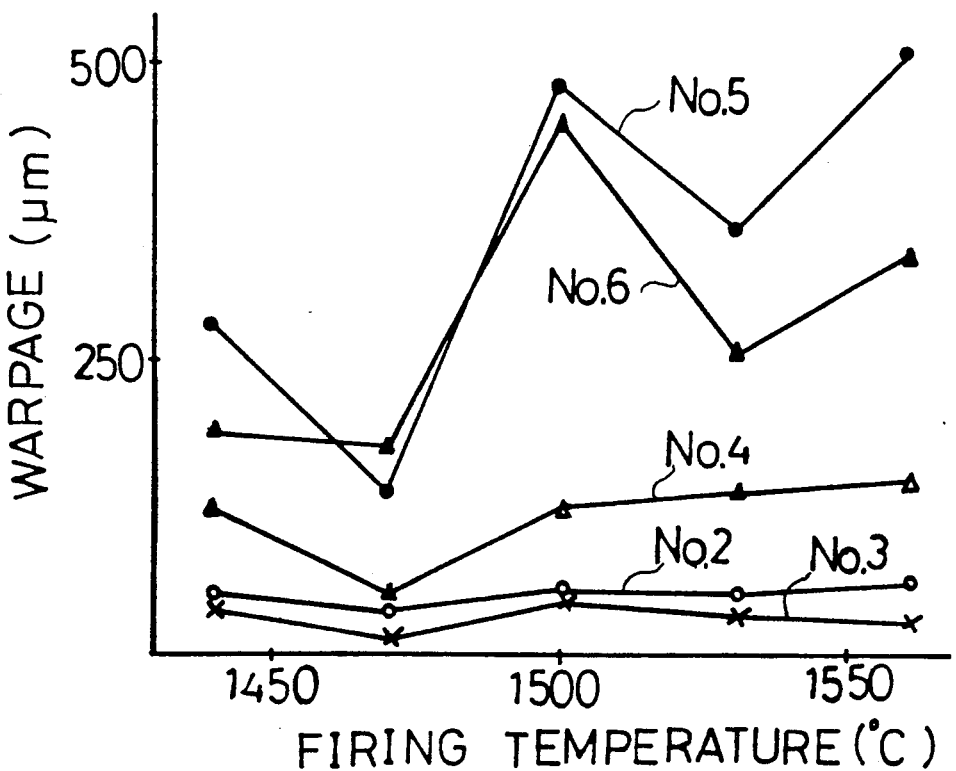
FIG. 2 is a graph showing the relationships between particle size distribution of ceramic base particles, firing temperature and warpage.

The sintered density of each sintered plate is shown in FIG. 1, and the warpage (depth of warpage, μm) in FIG. 2. The results show that the sintered plate Nos. 2 and 3 within the scope of this invention had a high sintered density, the theoretical value of which was substantially reached at a temperature of 1500° to 1560° C., and the theoretical density could be reached in a wide sintering temperature range. The warpage of the sintered plate Nos. 2 and 3, also, was extremely slight at any firing temperature.

On the other hand, the sintered plate Nos. 5 and 6 containing many finer particles have many internal voids, with a low sintered density and large warpage. In these sintered plates, furthermore, the sintered density was lower and the warpage larger as the firing temperature was higher. This indicates that a higher temperature leads to poorer passage of gas and insufficient and nonuniform degreasing, resulting in a larger number of void (which are considered to be formed through gasification of the binder or carbon confined in the inside of the material) and larger warpage. In the case of the sintered plate No. 1 containing many coarse particles, the sintered density was higher as the firing temperature was higher, but the theoretical density was not reached, which indicates unsatisfactory sintering properties.

Thus, the sintered plate Nos. 2 and 3 according to this invention had few internal voids, a high sintered density, and an extremely high dimensional accuracy with little warpage. The theoretical density and the little warpage could be secured over a wide range of firing temperature, and stable sintered plates could be obtained.

EXAMPLE 2

This example shows investigations of the relationship between the particle size distribution of the sintering assistant powder and the voids in the sintered body.

A glass frit ($SiO_2$:75%, CaO: 12.5%, MgO: 12.5%) was first pulverized in a wet system in a ball mill for respective times of 30 to 150 hours as shown in the following table 2, and the solvent (purified water) was evaporated off to prepare test powder product Nos. 7 to 11. The particle size distribution, the average particle diameter and the proportion of particles not smaller than 10 μm, of these powder products, are shown in the table 2.

TABLE 2

| No. | Test Powder Product | | | Sinterd Body |
|---|---|---|---|---|
| | Pulverizing Time (Hr) | Av. Particle Diameter (μm) | Particle not smaller than 10 μm (%) | Maximum Void Diameter (μm) |
| 7 | 30 | 4.7 | 21.0 | 30 |
| 8 | 50 | 3.7 | 8.0 | 20 |
| 9 | 70 | 2.6 | 3.0 | 12 |
| 10 | 100 | 2.0 | 1.5 | 10 |
| 11 | 150 | 1.8 | 1.5 | 10 |

Figure 4:
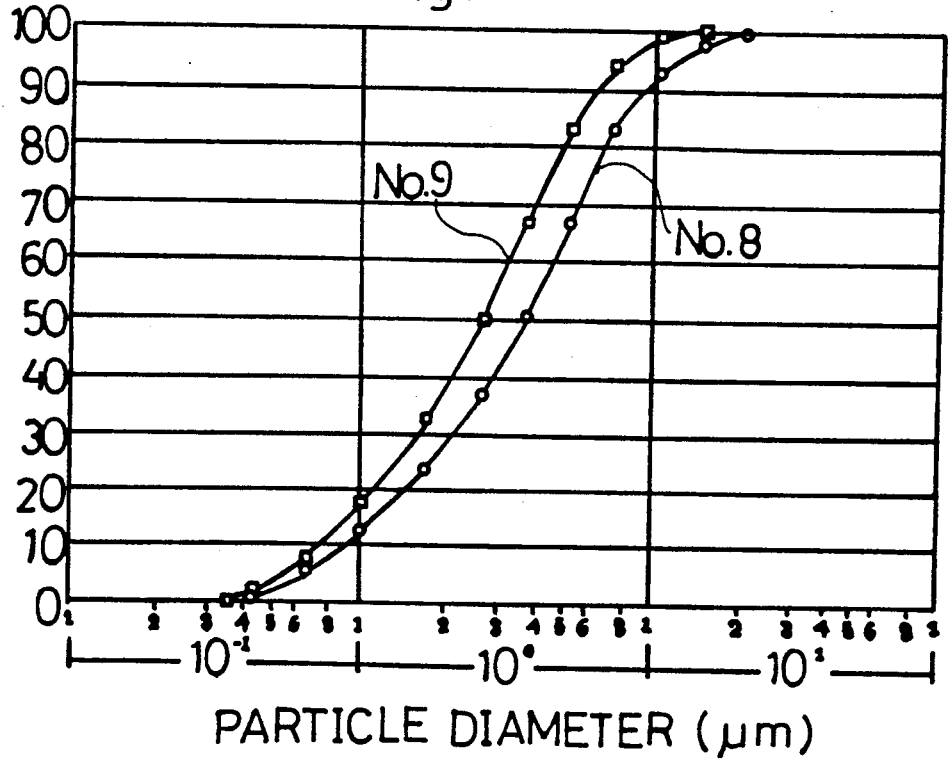
FIG. 4 is a graph showing particle size distribution of sintering assistant powders set forth as test powder product Nos. 8 and 9.

The particle size distribution was measured by a laser-type particle size distribution mersuring method with MICROTRACK (tradename, made by LEEDS & NORTHRUP), and the average particle diameter was represented by the particle diameter value at a cumulative particle number equal to 50% of the total number of particles. The measurement results of the particle size distribution of the test powder product No. 2 and 3 are shown in the FIG. 4.

Next, 8 parts by weight of each of the powder product No. 1 to 5 was mixed with 92 parts by weight of alumina (average particle diameter: 2.0 μm). To the resultant mixture were added 8 parts by weight of a polyvinyl butyral resin as a binder, 4 parts by weight of a phthalic acid ester as a plasticizer, and methyl ethyl ketone or toluene as a solvent, followed by uniform mixing to prepare each ceramic slurry. Each of the ceramic slurry was used to form a green sheet 0.6 mm thick by a tape casting method. Five such greensheets were laminated with each other, and the laminate was cut to a rectangular shape (40×30 mm).

Each of the rectangular laminate was then heated in the atmospheric air up to 250° C. at a rate of 30° C./h. From 250° C., the rectangular laminate was heated up to 1500° C. at a rate of 100° C./hr in a nitrogen/hydrogen/water vapor atmosphere (wetter, 50° C.), and maintained at that temperature for 2 hours to prepare each of sintered body Nos. 1 to 5 Of the sintered bodies, Nos. 3 to 5 are the products according to this invention, whole the other are comparative products.

The maximum void diameters of the sintered bodies were measured, the results being also shown in the table 2.

The results show that the maximum void diameter is not more than 12 μm where the proportion of the particles not smaller than 10 μm is not more than 3% (Nos. 3 to 5). Where the proportion is 8%, on the other hand, the maximum void diameter is 20 μm. It is thus seen that where the proportion is not more than 5%, the maximum void diameter is as small as 15 μm or below.

This invention is not limited to the above specific examples, and can be carried out with various modifications within the scope of the invention according to the intended purpose or use of the sintered product. That is, other than the control of the particle size distribution of the sintering assistant powder by regulating the pulverizing time as in this example, a control through removal of only coarse particles by classification or other controls can also be used.

The addition of the sintering assistant is not limited to the addition of the assistant in the form of a glass frit as in this example. Part or the whole of the glass frit may be replaced by an oxide itself ($SiO_2$, CaO or the like) or a carbonate, hydroxide or the like capable of being turned into an oxide by heating, whereby the same result as above are obtainable.

What is claimed is:

1. A method of producing a sintered ceramic body comprising the steps of controlling a ceramic base powder to have a particle size distribution such that the amount of powder particles not greater than 1.0 μm in size is 8 to 12% by weight and the average particle diameter is 3 to 4.5 μm, said controlling occurring prior to mixture of said base powder with any other powder; controlling a sintering assistant powder to have a particle size distribution such that the amount of powder particles not smaller than 10 μm in size is not more than 5% by weight; mixing said ceramic base powder, said sintering assistant powder and an organic binder after said controlling steps; molding the resultant mixture; degreasing said mixture by heating to a temperature of 250° C. in air; and sintering the molded body to produce the sintered body.

2. The method as defined in claim 1, wherein said ceramic base powder is a material selected from the group consisting of alumina, aluminum nitride, and mullite.

3. The method as defined in claim 1, wherein said ceramic base powder is alumina, and said sintering assistant powder is at least one of $SiO_2$, $CaCO_3$ and $MgCO_3$.

4. The method as defined in claim 1, wherein said particle size distribution of said sintering assistant powder is such that the amount of powder particles not smaller than 10 μm in size is 1 to 3% by weight.

5. The method as defined in claim 4, wherein the average particle diameter of said sintering assistant powder is 1 to 3 μm.

* * * * *